US00RE39186E

(19) United States
(12) Reissued Patent
Montgomery

(10) Patent Number: US RE39,186 E
(45) Date of Reissued Patent: Jul. 18, 2006

(54) CONVEYOR AND CONVEYOR BELT CLEANING SPROCKET

(76) Inventor: Preston D. Montgomery, 38 Hellium Dr., Amarillo, TX (US) 79124

(21) Appl. No.: 10/821,279

(22) Filed: Apr. 8, 2004

Related U.S. Patent Documents

Reissue of:
(64) Patent No.: 6,367,613
Issued: Apr. 9, 2002
Appl. No.: 09/645,041
Filed: Aug. 24, 2000

U.S. Applications:
(60) Provisional application No. 60/200,793, filed on Apr. 28, 2000.

(51) Int. Cl.
*B65G 45/22* (2006.01)

(52) U.S. Cl. ..... 198/495
(58) Field of Classification Search ..... 198/494–487
See application file for complete search history.

(56) References Cited

U.S. PATENT DOCUMENTS

| | | | | | |
|---|---|---|---|---|---|
| 1,543,411 | A | | 6/1925 | Wittig | |
| 1,888,498 | A | | 11/1932 | Gipe et al. | 198/495 |
| 2,016,186 | A | | 10/1935 | Vail | 8/19 |
| 2,974,631 | A | | 3/1961 | Thompson | 118/70 |
| 3,016,235 | A | * | 1/1962 | Cnudde | 432/228 |
| 3,583,544 | A | | 6/1971 | Prodzenski | 198/495 |
| 3,583,555 | A | | 6/1971 | Karsnak | 198/230 |
| 3,995,684 | A | * | 12/1976 | Schmid | 164/444 |
| 3,998,321 | A | | 12/1976 | Schultz | 198/495 |
| 4,601,385 | A | | 7/1986 | Sloan et al. | 198/495 |
| 4,860,883 | A | | 8/1989 | Knaul et al. | 198/495 |
| 5,058,728 | A | | 10/1991 | Leiweke et al. | 198/495 |
| 5,111,929 | A | | 5/1992 | Pierick et al. | 198/495 |
| 5,368,650 | A | | 11/1994 | Tanaka et al. | 134/15 |
| 5,443,139 | A | | 8/1995 | Scott | 184/15.2 |
| 5,524,746 | A | | 6/1996 | Massen et al. | 198/443 |
| 5,542,525 | A | | 8/1996 | Kornely | 198/495 |
| 5,598,915 | A | | 2/1997 | Malmberg et al. | 198/495 |
| 5,605,219 | A | | 2/1997 | Zimmerman et al. | 198/495 |
| 5,613,594 | A | | 3/1997 | Kootsouradis | 198/495 |
| 5,649,616 | A | | 7/1997 | Stecklow | 198/496 |
| 5,706,932 | A | | 1/1998 | White | 198/495 |
| 5,810,153 | A | | 9/1998 | Zimmerman et al. | 198/495 |
| 6,050,391 | A | | 4/2000 | Terry | 198/495 |
| 6,196,374 | B1 | | 3/2001 | Kilgert et al. | 198/495 |
| 6,364,959 | B1 | | 4/2002 | Straub et al. | 134/9 |
| 6,478,141 | B1 | | 11/2002 | Virippil et al. | 198/495 |
| 6,651,803 | B1 | | 11/2003 | Virippil et al. | 198/495 |
| 6,740,172 | B1 | * | 5/2004 | Griffiths et al. | 134/15 |
| 2002/0038755 | A1 | | 4/2002 | Virippil et al. | 198/495 |
| 2004/0026213 | A1 | | 2/2004 | Blue | 198/495 |

* cited by examiner

*Primary Examiner*—Khoi H. Tran
(74) *Attorney, Agent, or Firm*—Synnestvedt & Lechner

(57) ABSTRACT

A sprocket for an endless conveyor is disclosed having a plurality of fluid outlet passages arranged radially between the center of the sprocket and its outer circumferential surface. The outlet passages are positioned along the length of the sprocket in a helical path and are in fluid communication with an annular fluid conduit extending lengthwise along the center of the sprocket. A fluid inlet connected to the conduit supplies fluid under pressure to the conduit, the fluid spraying radially outwardly through the outlet passages to impinge on the inside surface of the endless conveyor and remove any accumulated debris. Nozzles are positioned within the outlet passages to control the fluid spray.

41 Claims, 5 Drawing Sheets

CONVEYOR AND CONVEYOR BELT CLEANING SPROCKET

Matter enclosed in heavy brackets [ ] appears in the original patent but forms no part of this reissue specification; matter printed in italics indicates the additions made by reissue.

RELATED APPLICATION

This application is based on and claims the benefit of prior filed co-pending provisional patent Application No. 60/200,793, filed Apr. 28, 2000.

FIELD OF THE INVENTION

This invention relates to sprockets used with endless conveyors, and especially to sprockets which are adapted to clean the conveyor when in operation.

BACKGROUND OF THE INVENTION

Conveyors comprising sprocket driven endless belts are used in a wide spectrum of industrial applications to transport items being manufactured or processed from point to point. The items being transported may leak or ooze liquids of varying viscosity, or shed dust, dirt, particles or debris which can accumulate on the belt and foul the conveyor.

This problem is especially acute in meat processing equipment where cuts of meat are transported on conveyors between processing stations and ooze blood, deposit viscous or congealed fat, cartilage, muscle, and other animal carcase liquids and debris onto the belt. Such organic matter cannot be allowed to accumulate on the conveyor because it quickly decays and presents a health hazard, rendering the conveyor unusable to transport meat for human consumption.

While it is a relatively simple matter to wash the outside surface of the conveyor on which the meat is supported to remove any accumulated organic matter, the various liquids and soft debris tend to work their way into and through crevasses, joints, hinges, interfaces and openings in the belt and a substantial amount of unwanted organic matter thereby accumulates on the inside surface of the belt and on the drive components such as the drive sprockets, idler sprockets and support rollers. Generally, the inside surface of the belt and the drive components are not easily accessible for cleaning, requiring that the conveyor be regularly shut down and maybe even partially disassembled to effect a thorough cleaning and removal of the accumulated organic matter.

There is clearly a need for a conveyor wherein the inside surface can be easily and regularly cleaned to remove unwanted debris, liquids, dust and dirt, especially when such debris comprises organic matter which can decay and foul the conveyor.

SUMMARY AND OBJECTS OF THE INVENTION

The invention concerns an endless conveyor for transporting items and is particularly suited (although not limited) to use in the meat processing industry. Preferably the conveyor comprises at least two rotatably mounted sprockets having respective axes of rotation parallel to one another and arranged in spaced relation along a path oriented perpendicularly to the axes. An endless belt is carried by the sprockets along the path, the endless belt having an outwardly facing surface for supporting the items, such as cuts of meat, and an inwardly facing surface opposite the outwardly facing surface. The inwardly facing surface engages the sprockets.

Preferably, at least one of the sprockets comprises an elongated body having an outer surface for support of the inwardly facing surface of the belt. A fluid conduit extends lengthwise within the body from one end. The one sprocket has a pair of supports for rotatably mounting the body, one of the supports having a fluid inlet communicating with the fluid conduit. A plurality of outlet passages extend from the fluid conduit and terminate in apertures in the outer surface of the body. The inlet passage supplies fluid under pressure to the fluid conduit and the fluid, preferably a cleaning liquid, flows outwardly through the outlet passages and the apertures onto the inwardly facing surface of the endless belt where it cleans that surface.

Preferably, the length of the one sprocket is substantially equal to the width of the belt, and the fluid conduit extends from the one end substantially to the other end of the body. This configuration allows the outlet passages and the apertures to be positioned in spaced relation lengthwise along the body, thus, ensuring that the entire width of the belt is subjected to the cleaning spray of fluid flowing out of the apertures.

While the sprocket may be used with almost any type of conveyor, it is especially effective when used with an endless belt which comprises a plurality of segments arranged side by side. The segments are hingedly connected to one another allowing them to pivot relative to each other when traversing around a sprocket. Because of the many hinges and joints required to ensure flexibility such belts have a marked tendency to accumulate debris on their inside surface as well as other normally inaccessible places such as in the joints between the segments. Cleaning sprockets as described above are particularly suited for use with segmented hinged belts and provide a convenient way to keep the entire belt clean without the need to bring the conveyor out of service for routine cleaning.

The sprocket spraying the fluid can be positioned anywhere along the belt path where it can engage the belt's inwardly facing surface to effectively clean the belt. For example, the sprocket could take the form of a support roller having a smooth outer cylindrical surface and be positioned somewhere between the ends of the belt. Preferably, the sprocket is a driver or an idler positioned at an end of the belt run where the belt segments pivot relatively to one another as they traverse the sprocket and transition to the return leg of their path.

To function effectively as a driver, it is preferable that the sprocket have a plurality of teeth spaced circumferentially around the body projecting radially outwardly to engage the inwardly facing surface of the belt. The belt preferably has a plurality of mating teeth projecting from its inwardly facing surface. The mating teeth on the belt interengage the teeth projecting from the body and allow the sprocket to turn without slipping relatively to the belt and impart the force to the belt necessary to drive it. To accommodate the belt at the end of the run and provide a smooth transition around the sprocket, the tips of the teeth intersect a common imaginary cylindrical support surface which envelops the sprocket.

To ensure that the spray covers the entire inwardly facing surface of the belt, the apertures are arranged in a row extending in a helix lengthwise along and around the cylindrical support surface. The helix arrangement helps to distribute the fluid spray evenly across the width of the belt and ensures that the belt is receiving a continuous spray of fluid across its width and not an intermittent burst, as would occur if the apertures were arranged in a straight line along the sprocket's length.

When the sprocket has teeth to engage the belt, it is preferable to position the apertures in between the teeth, thus, allowing the spray to clean the teeth as well as the belt. Furthermore the region in between the teeth normally does not come into contact with the belt, thus, allowing a continuous spray to be emitted from the apertures under a constant pressure. If the apertures were periodically blocked by contact with the belt, as they might be if located elsewhere on the sprocket, it would cause repeated pressure surges within the fluid conduit, changing the spray pattern and placing unnecessary stress on the various fluid handling components.

To more effectively control the fluid spray, it is preferable to fit nozzles within the apertures. Nozzles can be used to point the spray in a particular direction onto the belt, for example, perpendicularly or relatively tangentially to the inwardly facing surface. Nozzles can also be used to increase the impact force of the fluid stream by directing it into a jet to effectively dislodge stubborn particles or into a diffuse spray to envelop the entire inwardly facing belt surface as required for a particular application. Preferably, the nozzles are oriented substantially radially with respect to the long axis of the body.

It is an object of the invention to provide an endless conveyor wherein the inside surface can be easily and regularly cleaned.

It is another object of the invention to provide an endless conveyor which does not require disassembly to effect cleaning.

It is yet another object of the invention to provide a sprocket for a conveyor through which a fluid can be sprayed onto the inside surface of the conveyor to effect cleaning.

These and other objects of the invention will become apparent from a consideration of the following drawings and detailed description of the preferred embodiment.

DETAILED DESCRIPTION OF THE PREFERRED EMBODIMENT

Figure 1:
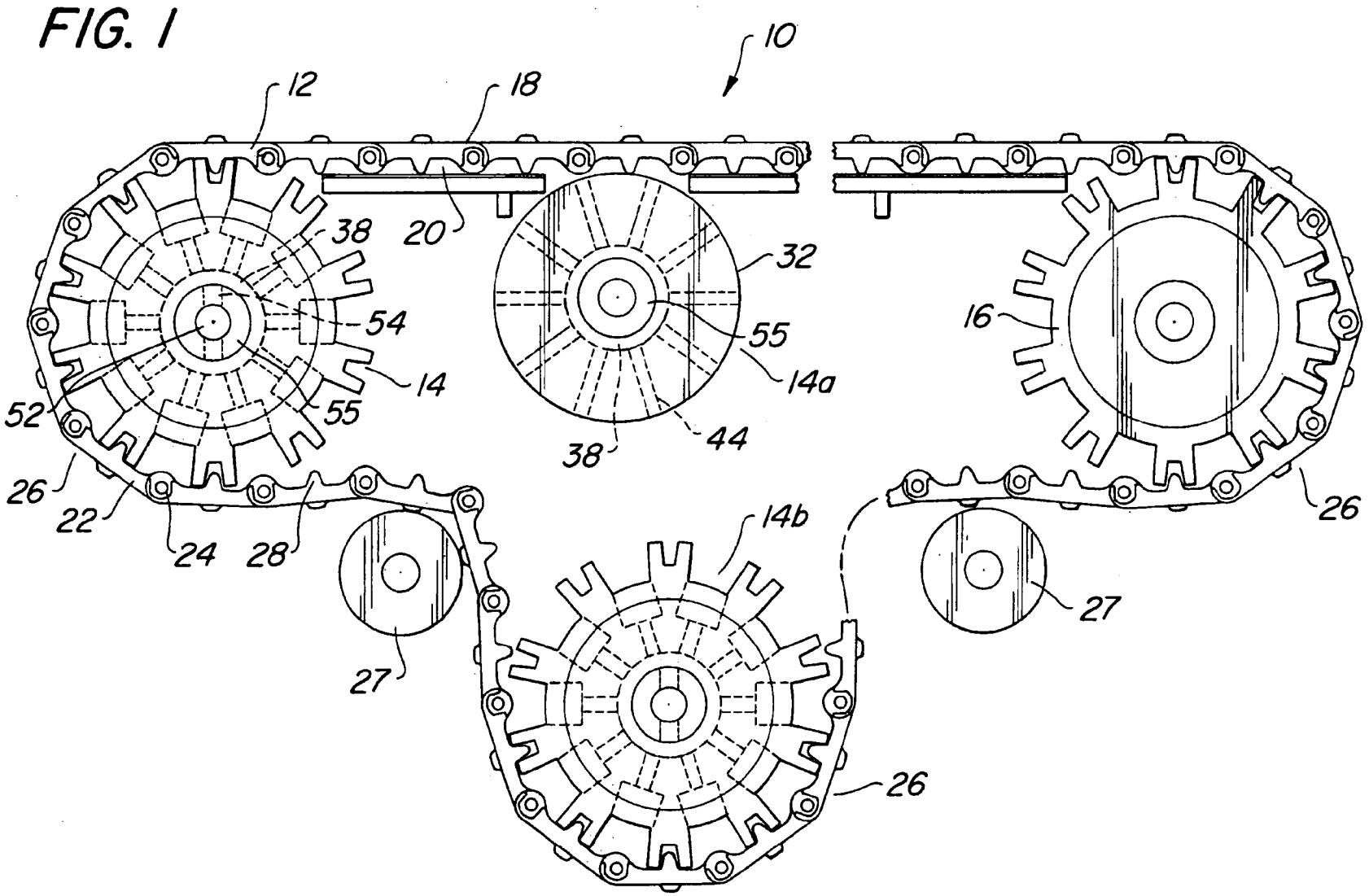
FIG. 1 is a side view of an endless conveyor according to the invention.

FIG. 1 shows an endless conveyor 10 according to the invention, the conveyor having an endless belt 12 suspended between two rotatably mounted sprockets 14 and 16. Belt 12 has an outwardly facing surface 18 on which the items to be transported by the belt are supported and an inwardly facing surface 20 opposite the surface 18 and engaging sprockets 14 and 16. Belt 12 is preferably made of a plurality of segments 22 arranged side by side and hingedly connected to one another by hinge pins 24 allowing segments 22 to pivot relative to one another when traversing around sprockets 14, 14b and 16 as shown at positions 26 in FIG. 1. Preferably, segments 22 have mating teeth 28 projecting from the inwardly facing surface 20 to engage teeth on sprockets 14, 14b and 16 described below. As noted above, sprocket 14 could be an idler sprocket, a driver sprocket, a support roller such as 14a in FIG. 1, positioned to engage inwardly facing surface 20 of belt 12 at intermediate points along its run or a belt tensioning sprocket 14b positioned at a loop of belt 12 to interact with a pair of tensioning rollers 27 to facilitate tensioning of the belt.

Figure 2:
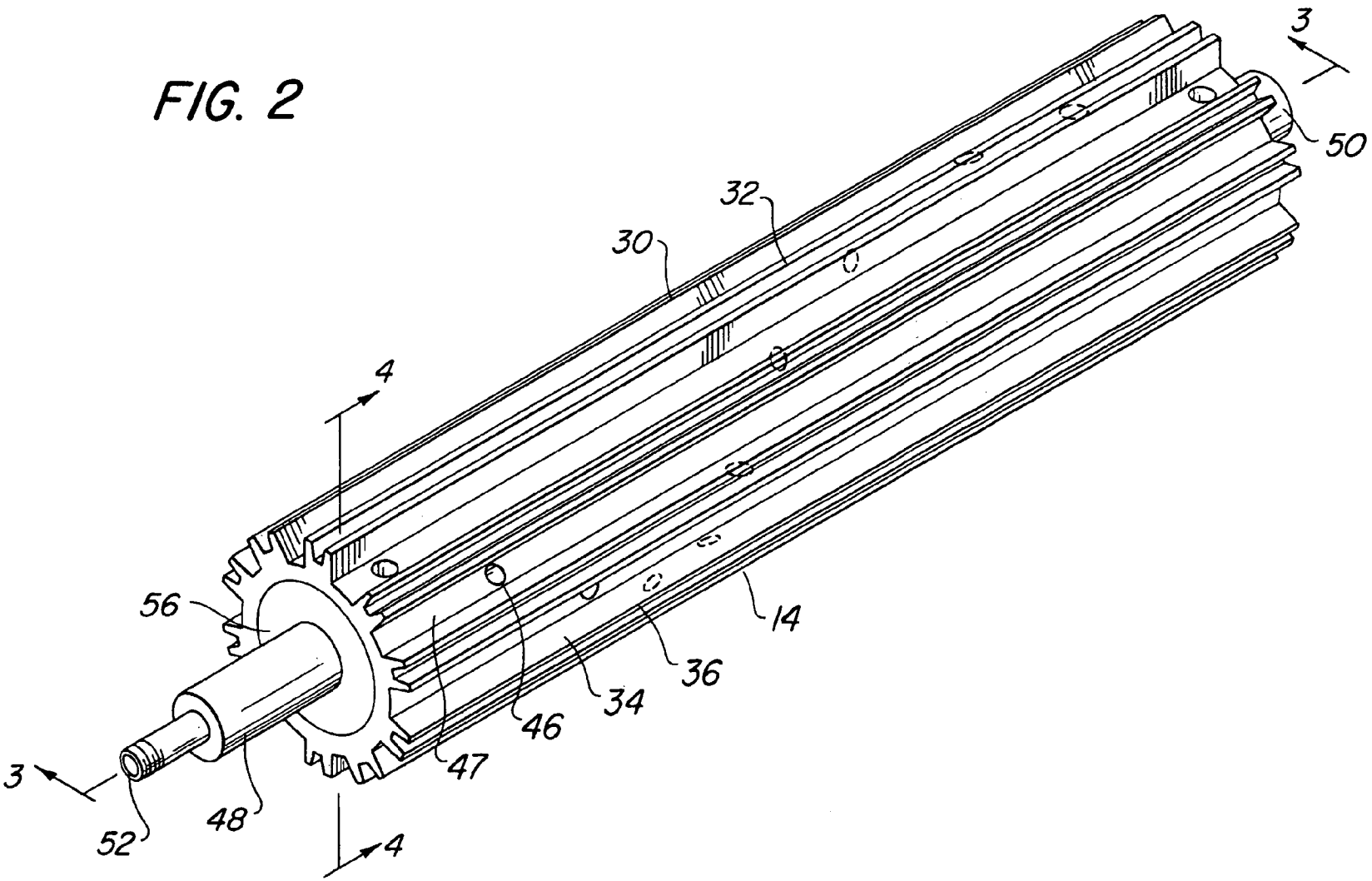
FIG. 2 is a perspective view of a sprocket according to the invention shown in FIG. 1.
Figure 6:
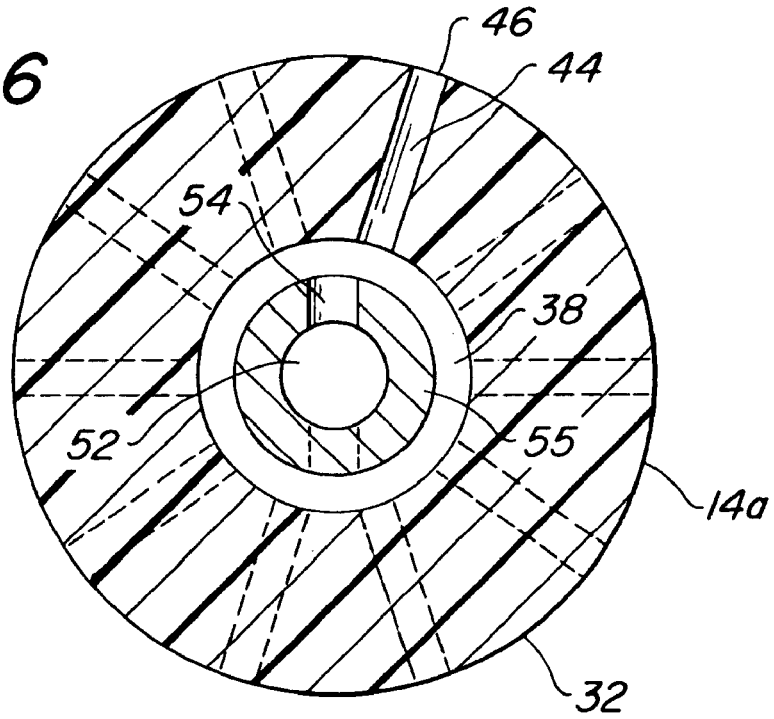
FIG. 6 is a cross-sectional view of an alternate embodiment of the sprocket shown in FIG. 2.

FIG. 2 shows a detailed perspective view of sprocket 14 which preferably comprises an elongated body 30 having an outer surface 32 for support of inwardly facing surface 20 of belt 12. Surface 32 may be a cylindrical surface as seen at 14*a* in FIGS. 1 and 6 where the sprocket frictionally engages the inwardly facing surface 20 to provide support of the belt along its run. However, when used as an idler or a driven sprocket surface 32 is preferably formed by a plurality of teeth 34, the tips 36 of the teeth being coincident with an imaginary cylindrical surface 31 enveloping the sprocket (shown in dashed line in FIG. 4). Teeth 34 are sized and shaped to engage mating teeth 28 on the inwardly facing surface 20 of belt 12 and permit the sprocket to rotate without slipping relatively to the belt. This is most efficient when the sprocket is used as a driver but is also useful when the sprocket is an idler or a support roller as it ensures that the sprocket rotates whenever the belt rotates, the significance of which is explained below.

Figure 3:
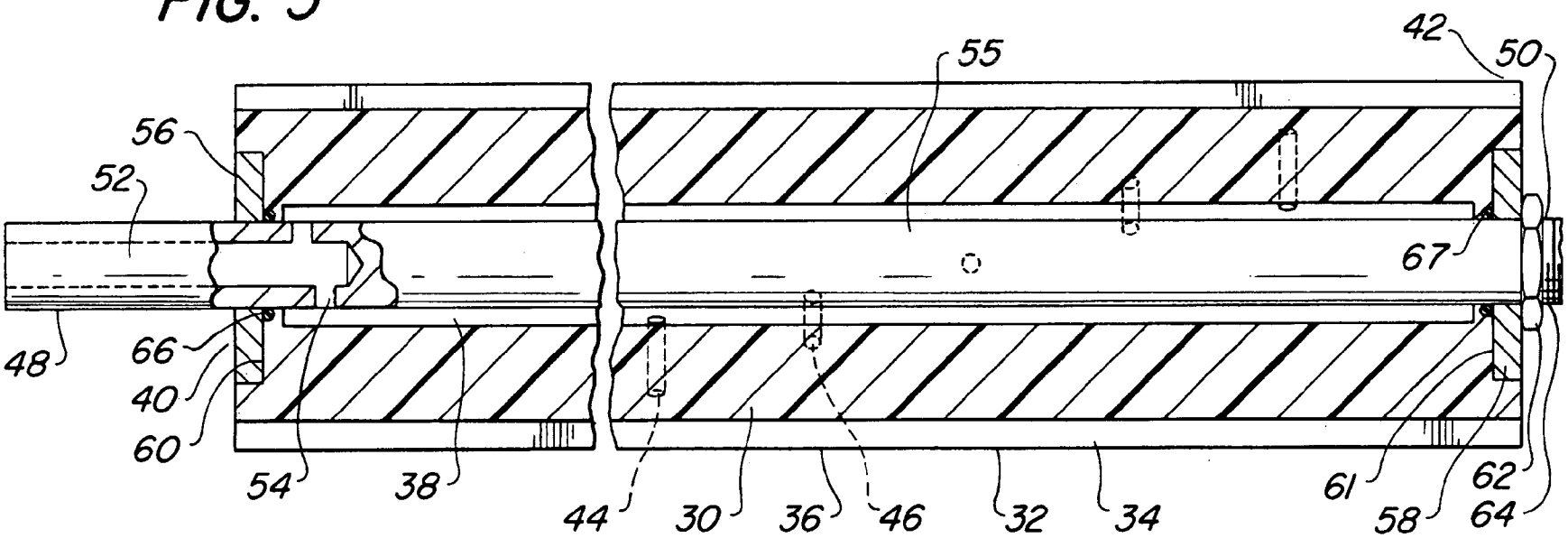
FIG. 3 is sectional view taken along line 3—3 in FIG. 2.
Figure 4:
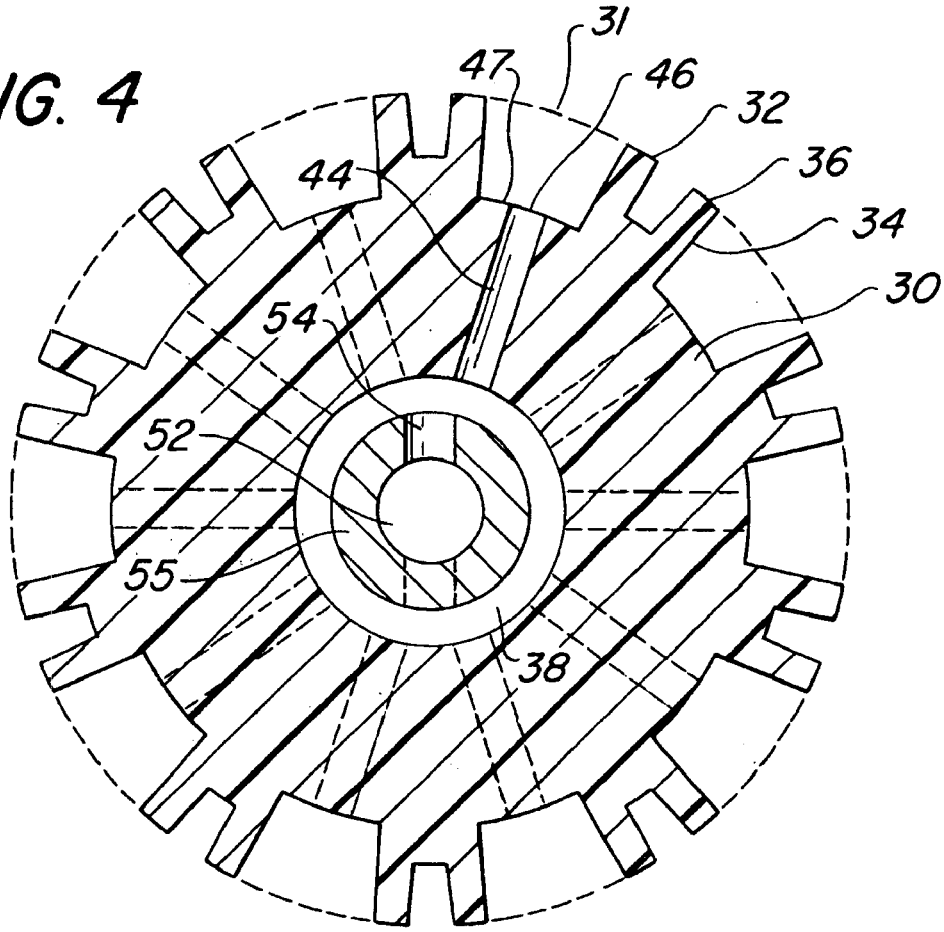
FIG. 4 is a cross-sectional view taken along line 4—4 of FIG. 2.

As shown in FIG. 3, a fluid conduit 38 extends lengthwise within the elongated body 30 from one end 40 and preferably substantially to the other end 42. As best shown in FIG. 4, a plurality of outlet passages 44 extend from the fluid conduit 38 and terminate in apertures 46 in an outer surface 47 of the body 30.

As shown in FIGS. 2 and 3, sprocket 14 has a pair of supports 48 and 50, which extend from the ends of the sprocket allowing it to be rotatably mounted, for example in a pair of journal bearings (not shown). One of the supports, for example 48, has a fluid inlet passage 52 extending through it and communicating with fluid conduit 38 by means of openings 54.

Fluid, supplied under pressure to fluid inlet passage 52 through a suitable coupling (not shown) flows through the inlet passage into the fluid conduit 38, through the outlet passages 44 and exits through apertures 46 where the spray contacts the inwardly facing surface 20 of belt 12 to dislodge any debris or residue which has formed on the surface.

To ensure that the belt receives the effect of the cleaning spray over the entire width, it is preferable that the width of the sprocket be substantially the same as the width of the belt and that the fluid conduit 38 extend substantially from one end of the sprocket 40 to the other end 42.

Preferably, fluid outlet passages 44 are positioned in spaced relation lengthwise along body 30, and more preferably, the outlet passages are arranged in a row extending in a helix lengthwise along and around the cylinder as shown in FIGS. 2 and 3. Arranging the outlet passages along the entire length ensures that the fluid and its cleansing action will be distributed over the entire width of the belt, and arranging the outlets in a helix ensures that the belt is receiving a continuous spray of fluid across its width and not an intermittent burst, as would occur if the apertures were arranged in a straight line along the sprocket's length. Sprocket teeth 34 engaging mating teeth 28 on belt 12 ensure that the sprocket rotates without slipping relatively to the belt and as the sprocket rotates it is constantly directing a different stream of fluid at a different portion of the belt for maximum cleaning coverage.

As a practical matter, the supports 48 and 50 may be mounted at the ends of a continuous axle 55 which extends entirely through the fluid conduit 38. To seal the body 30 at the ends 40 and 42 where the axle emerges, each end of the axle is provided with a sealing flange 56 and 58. Flanges 56 and 58 are sized to seat against respective sealing surfaces 60 and 61 arranged at each end of the body surrounding the fluid conduit 38. One of the flanges, for example, 56, is preferably permanently attached to the axle, the other flange 58 being removable and held in place by a nut 62 engaging threads 64 on the support 50. The axle has a smaller diameter than the fluid conduit providing an annular space through which the fluid can flow the entire length of the conduit. When the axle 55 is inserted in the conduit 38, sealing flange 56 is seated against sealing surface 60 at end 40 of the body, support 50 extends from fluid conduit 38 at end 42, and sealing flange 58 is seated against sealing surface 61 at end 42. Nut 62 engages threads 64 and is torqued to force the sealing flanges against the sealing surfaces to effect a fluid tight seal at each end of the body. O-rings 66 and 67 may also be used between the sealing flanges and the sealing surfaces to effect the seal.

As seen in FIG. 4, the outlet passages 44 are preferably radially oriented with respect to the outer surface 46 of the body 30, although it is contemplated that other orientations would also be possible and practical under certain conditions. Preferably, the apertures 46 are located between teeth 34 in a region which faces hinge pins 24 (see FIG. 1) but does not contact the belt 12 directly. Thus, a continuous stream of fluid emerges from each of the apertures 44 regardless of the relative position of an aperture to the belt. This allows the sprocket to spray at a constant pressure and avoids pressure surges which might occur if a particular aperture were blocked by contact with the belt as it traverses the sprocket.

Figure 5:
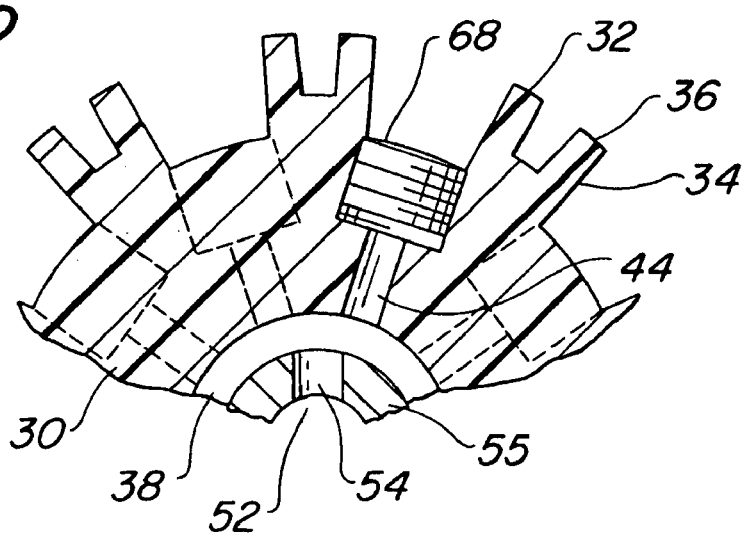
FIG. 5 is a partial cross-sectional view of the sprocket shown in FIG. 2.

As shown in FIG. 5, nozzles 68 may be mounted within the fluid outlet passages 44 to control the stream of fluid from the outlet passages against the inwardly facing surface 20 of belt 12. The nozzles can form the spray into any combination of configurations, from a concentrated jet hitting the belt with a high velocity to blast debris and residue from the belt, to a wide angle spray to soak the belt over a wide area. The nozzles can be permanently set to a particular spray regime or adjustable for maximum versatility.

Figure 7:
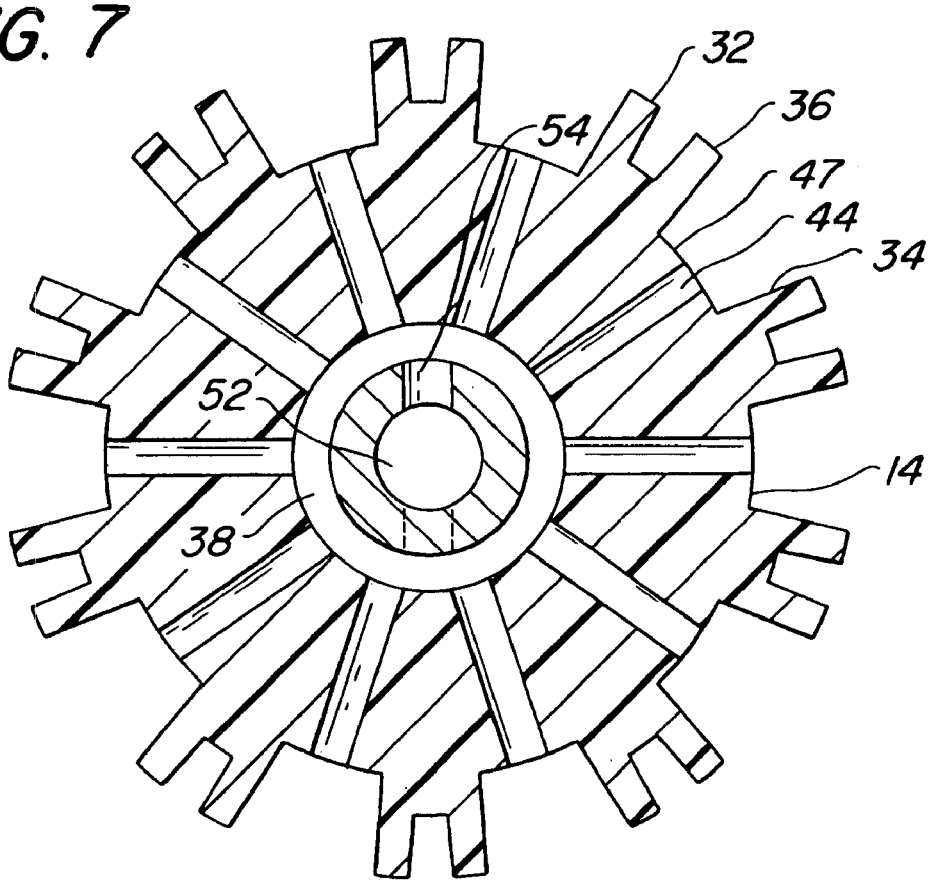
FIG. 7 is a cross-sectional view of another alternate embodiment of the sprocket shown in FIG. 2.

An alternate embodiment for the arrangement of outlet passages 44 is shown in FIG. 7. Instead of arranging one outlet passage at each particular cross-section along the length of body 30, multiple outlet passages are arranged at each cross section, thereby providing a symmetrical radial spray of fluid to clean the belt 12 along the entire length of the sprocket 14.

It is contemplated that the fluid to be sprayed from the sprocket may be a gas such as compressed air. Such a system would be practical, for example, if it is desired to prevent the accumulation of dust on the conveyor. For a conveyor used to transport cuts of meat where viscous organic matter and residue will accumulate on the belt, it is preferable that the sprocket spray a liquid such as water or a liquid detergent or other cleaning fluid to most effectively remove the organic matter from the belt.

Use of a sprocket cleaning belt according to the invention increases the efficiency of plant operations as the conveyors cleaned of debris and residue need not be taken out of service and disassembled to clean otherwise inaccessible regions such as the inwardly facing surface of the belt. The sprocket cleaning belt will also improve the sanitary condition of the conveyor as it ensures a thorough cleaning of the belt, which might not otherwise occur.

What is claimed is:

1. An endless conveyor for transporting items, said conveyor comprising:

at least two rotatably mounted sprockets having respective axes of rotation parallel to one another and arranged in spaced relation along a path oriented perpendicularly to said axes;

an endless belt carried by said sprockets, said endless belt having an outwardly facing surface for supporting said items and an inwardly facing surface opposite said outwardly facing surface and engaging said sprockets, at least one of said sprockets comprising:

an elongated body having an outer surface facing said inwardly facing surface of said belt;

a fluid conduit extending lengthwise within said body from one end thereof;

a pair of supports for rotatably mounting said body;

a fluid inlet passage communicating with said fluid conduit; and a plurality of outlet passages extending from said fluid conduit, said outlet passages terminating in apertures in said outer surface, said inlet passage supplying fluid under pressure to said fluid conduit and outwardly through said outlet passages and said apertures onto said inwardly facing surface of said endless belt.

2. An endless conveyor according to claim 1, wherein the length of said one sprocket is substantially equal to the width of said belt.

3. An endless conveyor according to claim 2, wherein said fluid conduit extends from said one end substantially to the other end of said body.

4. An endless conveyor according to claim 3, wherein said outlet passages and said apertures are positioned in spaced relation lengthwise along said body.

5. An endless conveyor according to claim 1, wherein said endless belt comprises a plurality of segments arranged side-by-side and hingedly connected to one another, said segments pivoting relative to each other when traversing around said sprockets.

6. An endless conveyor according to claim 5, further comprising a plurality of teeth spaced circumferentially around said body and projecting radially outwardly therefrom, and a plurality of mating teeth projecting from said inwardly facing surface of said endless conveyor, said mating teeth interengaging said teeth projecting from said body and allowing said sprocket to turn without slipping relatively to said belt.

7. An endless conveyor according to claim 4, wherein said one sprocket is an idler sprocket.

8. An endless conveyor according to claim 7, wherein said one sprocket is positioned at one end of said conveyor.

9. An endless conveyor according to claim 4, wherein said apertures are arranged in a row extending in a helix lengthwise along and around said cylindrical support surface.

10. An endless conveyor according to claim 6, wherein at least one of said apertures is positioned in between two of said teeth.

11. An endless conveyor according to claim 1, further comprising at least one nozzle fitted within one of said apertures, said nozzle controlling the spray of said fluid through said aperture.

12. An endless conveyor according to claim 11, wherein said nozzle is oriented substantially radially with respect to the long axis of said body.

13. An endless conveyor according to claim 1, wherein said fluid is a liquid.

14. A sprocket adapted to spray a fluid for cleaning an endless conveyor, said sprocket comprising:

an elongated body having an outer surface for support of an inwardly facing surface of said endless conveyor;

a pair of supports for rotatably mounting said body, said outer surface following a cylindrical path upon rotation of said elongated body relative to said supports;

a fluid conduit extending lengthwise within said body from one end thereof;

fluid inlet passage communicating with said fluid conduit; and a plurality of outlet passages extending from said fluid conduit, said passages terminating in apertures in said outer surface, said inlet passage supplying fluid under pressure to said fluid conduit and outwardly through said outlet passages and said apertures onto said inwardly facing surface of said endless conveyor.

15. A sprocket according to claim 14, wherein said fluid conduit extends substantially from said one end to the other end of said body.

16. A sprocket according to claim 15, wherein said outlet passages and said apertures are positioned in spaced relation lengthwise along said body.

17. A sprocket according to claim 14, wherein said outlet passages are oriented substantially radially with respect to the long axis of said body.

18. A sprocket according to claim 16, wherein the length of said sprocket is substantially equal to the width of said conveyor.

19. A sprocket according to claim 14, further comprising a plurality of teeth spaced circumferentially around said body and projecting radially outwardly therefrom, said teeth engaging mating teeth arranged on said inwardly facing surface of said endless conveyor allowing said sprocket to turn without slipping relatively to said conveyor.

20. A sprocket according to claim 14, wherein said teeth extend continuously substantially along the entire length of said body.

21. A sprocket according to claim 20, wherein said apertures are arranged in a row extending in a helix lengthwise along and around said cylindrical support surface.

22. A sprocket according to claim 19, wherein at least one of said apertures is positioned in between two of said teeth.

23. A sprocket according to claim 14, further comprising at least one nozzle fitted within one of said apertures, said nozzle controlling the spray of said fluid through said aperture.

24. A sprocket according to claim 14, wherein said fluid inlet extends through one of said supports at said one end thereof, said body has a sealing surface having a hole therein sized to accept said one of said supports in mating interengagement, said one of said supports having a sealing flange extending outwardly therefrom, said sealing flange seating against said sealing surface, said sealing surface and said flange sealing said fluid conduit.

*25. A sprocket adapted to spray a fluid for cleaning an endless conveyor, said sprocket comprising:*

*an elongated body having an outer surface positionable facing an inwardly facing surface of said endless conveyor;*

*a fluid conduit extending lengthwise within said body from one end thereof;*

*a fluid inlet passage in fluid communication with said fluid conduit; and*

*a plurality of outlet passages extending from said fluid conduit, said passages terminating in apertures in said outer surface, said inlet passage supplying fluid under pressure to said fluid conduit and outwardly through said outlet passages and said apertures toward said inwardly facing surface of said endless conveyor.*

*26. A sprocket according to claim 25, wherein said fluid conduit extends substantially from said one end to the other end of said body.*

*27. A sprocket according to claim 25, wherein said outlet passages and said apertures are positioned in spaced relation lengthwise along said body.*

*28. A sprocket according to claim 25, wherein said outlet passages are oriented substantially radially with respect to the long axis of said body.*

*29. A sprocket according to claim 25, wherein the length of said body is substantially equal to the width of said conveyor.*

*30. A sprocket according to claim 25, further comprising a plurality of teeth spaced circumferentially around said body and projecting radially outwardly therefrom, said teeth engaging mating teeth arranged on said inwardly facing surface of said endless conveyor allowing said sprocket to turn without slipping relatively to said conveyor.*

*31. A sprocket according to claim 30, wherein said teeth extend substantially continuously along the length of said body.*

*32. A sprocket according to claim 25, wherein said apertures are arranged in a row extending in a helix lengthwise along and around said body.*

*33. A sprocket according to claim 25, wherein at least one of said apertures is positioned between two of said teeth.*

*34. A sprocket according to claim 25, further comprising at least one nozzle fitted within one of said apertures, said nozzle controlling the spray of said fluid through said aperture.*

*35. A sprocket adapted to spray a fluid for cleaning an endless conveyor, said sprocket comprising:*

*an elongated body having an outer surface positionable facing an inwardly facing surface of said endless conveyor;*

*said elongated body including a fluid conduit extending from one end thereof:*

*a fluid inlet passage in fluid communication with said fluid conduit; and*

*a plurality of outlet passages in fluid communication with said fluid conduit, said outlet passages being directed outwardly toward said inwardly facing surface of said endless conveyor.*

*36. A sprocket according to claim 35, wherein said outlet passages are positioned in spaced relation lengthwise along said body.*

*37. A sprocket according to claim 35, wherein said outlet passages are oriented substantially radially with respect to the long axis of said body.*

*38. A sprocket according to claim 35, further comprising a plurality of teeth spaced circumferentially around said body and projecting radially outwardly therefrom, said teeth being engageable with mating teeth arranged on said inwardly facing surface of said endless conveyor allowing said sprocket to turn without slipping relatively to said conveyor.*

*39. A sprocket according to claim 35, further comprising at least one nozzle fitted within one of said outlet passages.*

*40. A sprocket adapted to spray a fluid for cleaning an endless conveyor, said sprocket comprising:*

*an elongated body having an outer surface positionable facing an inwardly facing surface of said endless conveyor;*

*said elongated body including a fluid conduit extending from one end thereof;*

*a fluid inlet passage in fluid communication with said fluid conduit; and*

*a plurality of outlet means for directing fluid from said fluid conduit outwardly toward said inwardly facing surface of said endless conveyor.*

*41. An endless conveyor for transporting items, said conveyor comprising:*

*at least two rotatably mounted sprockets arranged in spaced relation;*

*an endless belt carried by said sprockets, said endless belt having an outwardly facing surface for supporting said items and an inwardly facing surface opposite said outwardly facing surface, at least one of said sprockets comprising:*

*an elongated body having at least one outer surface facing said inwardly facing surface of said belt;*

*a fluid conduit extending lengthwise from one end of said body;*

*at least one support for rotatably mounting said body; and*

*a plurality of outlet passages in fluid communication with said fluid conduit and being directed outwardly toward said inwardly facing surface of said endless belt.*

* * * * *